April 6, 1971 H. DEANS ET AL 3,574,037
ULTRASONIC SPLICER
Filed Feb. 12, 1968 2 Sheets-Sheet 2
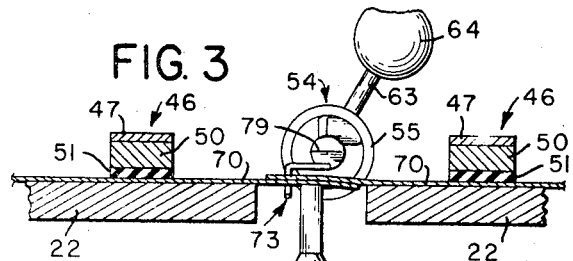
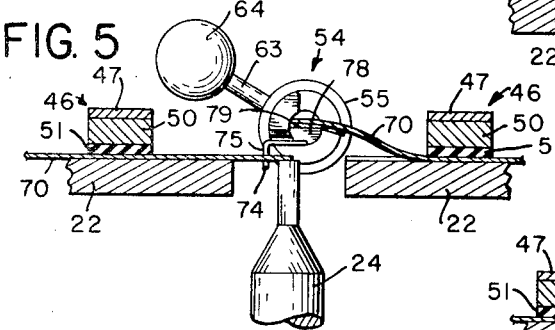
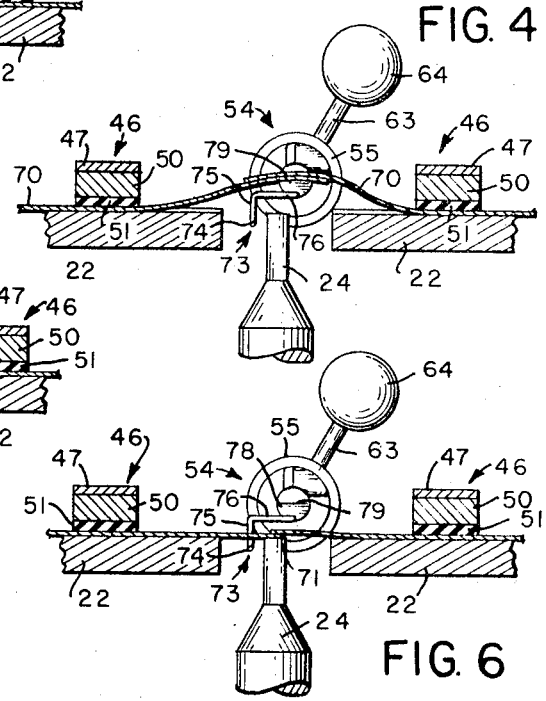
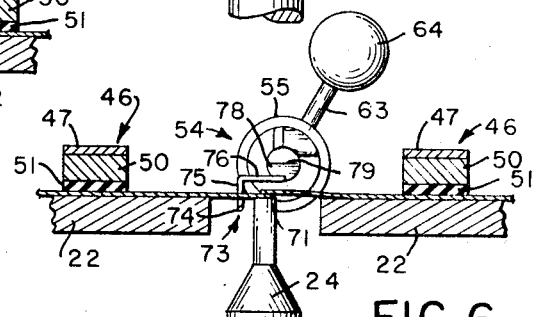
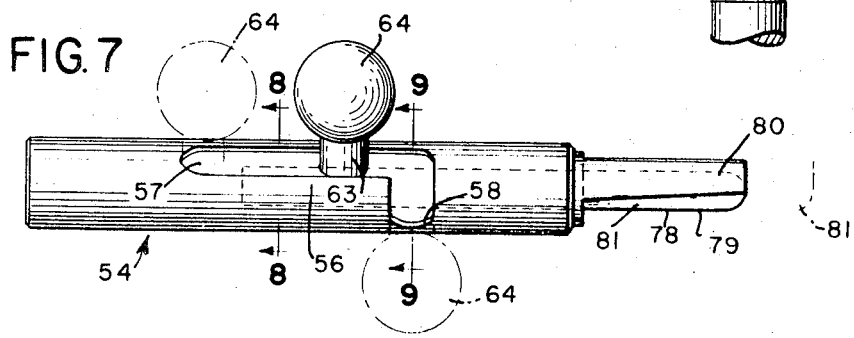
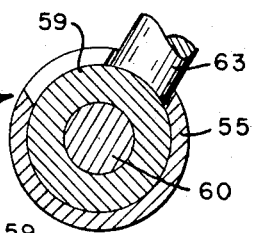
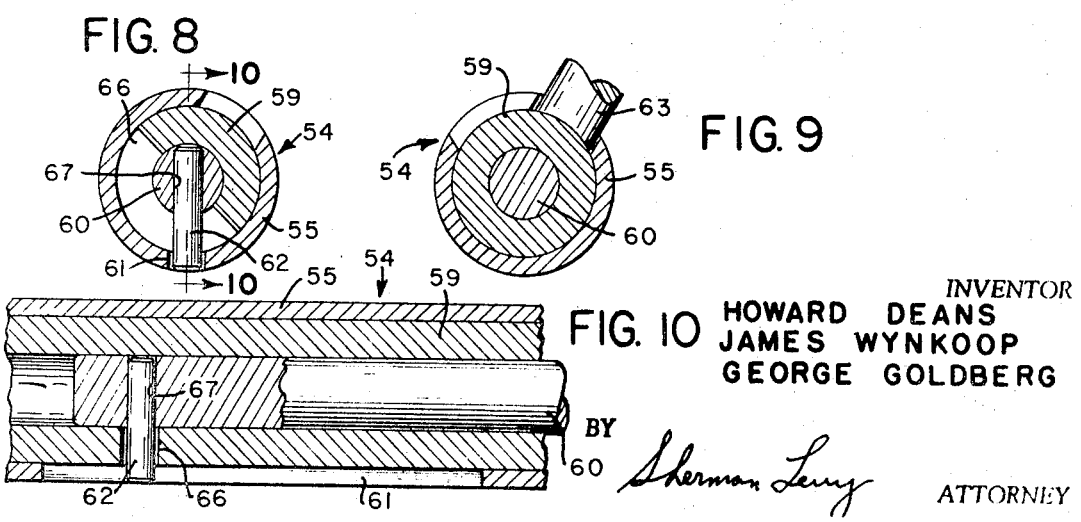
INVENTOR
HOWARD DEANS
JAMES WYNKOOP
GEORGE GOLDBERG
BY Sherman Levy
ATTORNEY United States Patent Office 3,574,037
Patented Apr. 6, 1971

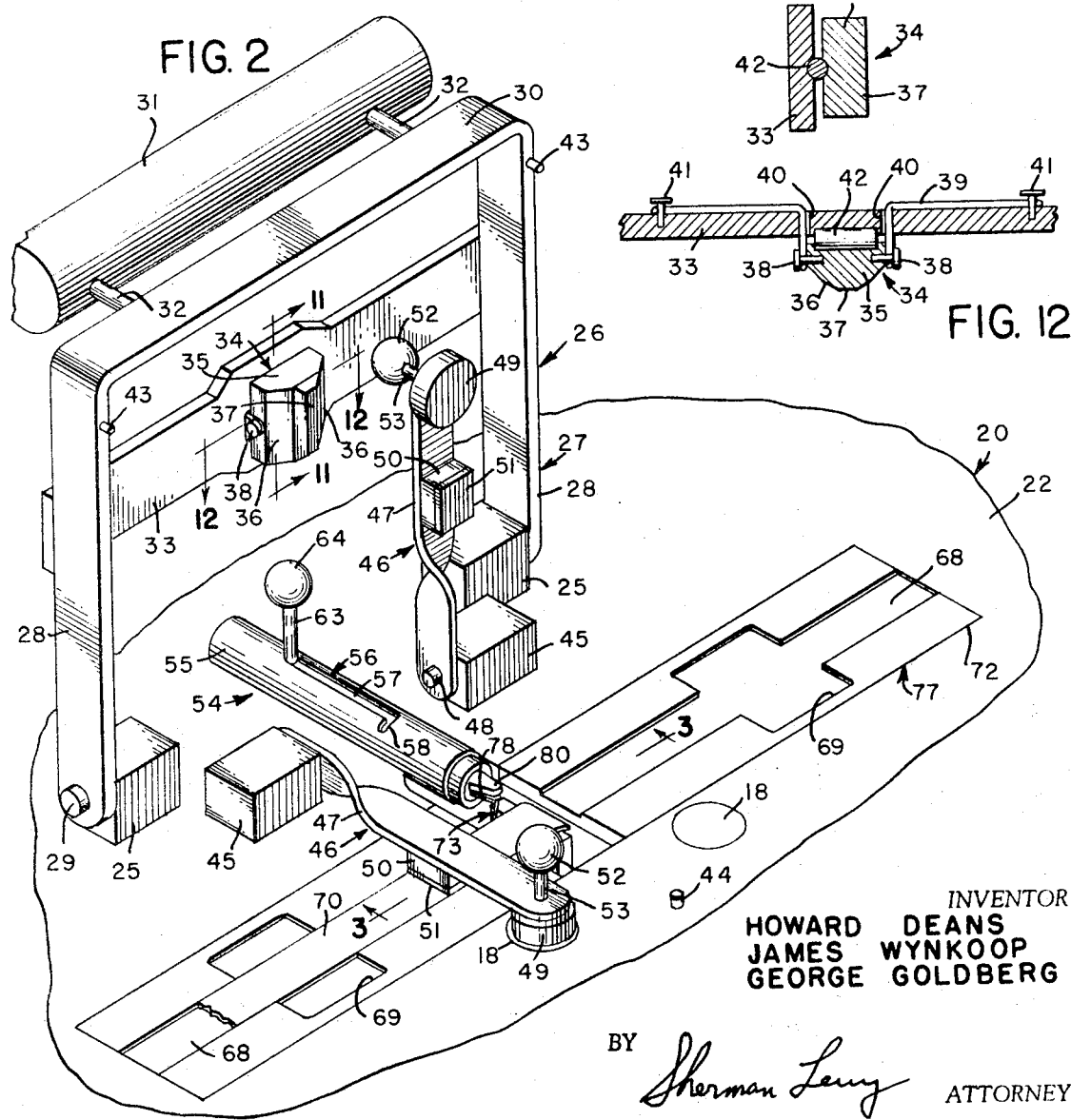

3,574,037
ULTRASONIC SPLICER
Howard Deans, Secane, and James Wynkoop, Drexel Hill, Pa., and George Goldberg, Jericho, N.Y., assignors to Kleer-Vu Industries, Inc., New York, N.Y.
Filed Feb. 12, 1968, Ser. No. 704,913
Int. Cl. G03d 15/04
U.S. Cl. 156—502
2 Claims

ABSTRACT OF THE DISCLOSURE

A high-speed splicer for sealing film ultrasonically which has a new cutting and handling concept, a compact console arrangement, a repeating mechanism and a means for providing a high tensile strength of splice.

BACKGROUND OF THE INVENTION

(1) Field of the invention

The present invention pertains to the field of film splicers in Class 156, subclass 73, and subclasses 502 and 157.

(2) Description of the prior art

The prior art includes the following patents: 962,381, 2,267,914, 2,577,570, 3,001,936, 3,050,107, 3,117,051, 3,142,607, 3,331,719.

Some of the differences or advantages that the present invention has over these prior patents is as follows:

The ultrasonic splicer for microfilm and movie film of the present invention accomplishes the actual splice seal through a one-shot ultrasonic bar seal, the ultrasonic transducer and tool are mounted rigidly below the table, an anvil movable downwardly for pressing the film on to the tool, and wherein there is provided a unique cutting device and wherein the film is held in position on the table top during the cutting and sealing by magnetic hold downs.

SUMMARY OF THE INVENTION

In accordance with the present invention there is provided a high-speed splicer for sealing film ultrasonically, wherein the splicer is economical to operate and eliminates the need of using splicing tape. The splice has high tensile strength, there is an improved and new cutting and handling concept and repeatability, and wherein there is provided a compact console arrangement.

BRIEF DESCRIPTION OF THE DRAWINGS

FIG. 1 is a perspective view illustrating the ultrasonic splicer of the present invention.

FIG. 2 is an enlarged detailed perspective view of the film holder and cutter showing the parts separated for clarity of illustration.

FIG. 3 is a setcional view taken on the line 3—3 of FIG. 2.

FIG. 4 is a view generally similar to FIG. 3 but illustrating the next step in the cutting of the film.

FIG. 5 is a view similar to FIG. 4.

FIG. 6 is a view similar to FIG. 5 with the cutter retracted and the film in condition to seal.

FIG. 7 is a top plan view of the cutter per se.

FIG. 8 is an enlarged sectional view taken on the line 8—8 of FIG. 7.

FIG. 9 is an enlarged sectional view taken on the line 9—9 of FIG. 7.

FIG. 10 is a sectional view taken on the line 10—10 of FIG. 8.

FIG. 11 is a sectional view taken on the line 11—11 of FIG. 2.

FIG. 12 is a sectional view taken on the line 12—12 of FIG. 2.

DESCRIPTION OF THE PREFERRED EMBODIMENT

Referring in detail to the drawings, the numeral 20 indicates the ultrasonic splicer of the present invention which includes a table that includes a plurality of vertically disposed parallel legs 21 as well as a top member 22 which may be suitably affixed to the legs 21. The numeral 23 indicates a conventional transducer, and the numeral 24 indicates a transducer tool which is rigidly mounted below the table top 22 with the tool facing upwardly as shown in the drawings. As shown in FIG. 1, a control mechanism or control panel 19 is provided with the usual control elements for the transducer assembly.

The numeral 25 indicates each of a pair of support members or blocks which are suitably affixed to the table top 22, and an anvil mechanism 26 is provided which includes a pivotally mounted yoke 27, and the yoke 27 is of generally U-shape and comprises a pair of spaced parallel legs 28 that are connected as at 29 to the blocks 25. The yoke 27 further includes an end portion 30 which has a handle 31 connected thereto as at 32. The numeral 33 indicates a cross-piece which extends between the legs 28 and which is is secured thereto in any suitable manner, and an anvil element 34 is arranged contiguous to the intermediate portion of the cross-piece 33. The anvil element 34 embodies a body member 35 which has tapered side surfaces 36 and a flat outer surface 37. Securing elements 38 are affixed to the sides of the body member 35 and flexible or yieldable bands such as rubber bands 39 engage the securing elements 38 and extend through openings 40 in the cross-piece 33, and the bands 39 are adapted to be anchored to the cross-piece 33 as at 41, FIG. 12. The numeral 42 indicates a pivotal support element that is interposed between the body member 35 and the cross-piece 33. Stop members 43 are carried by the yoke 27 as shown in FIG. 2. The numeral 44 indicates a microswitch which is supported by a table top for engagement by an anvil mechanism for a purpose to be later described. There is further provided a pair of spaced apart support elements 45 which are suitably affixed to the table top 22, and film hold down members 46 are provided which include arms 47 that are pivotally connected to the support element 45 as at 48. Magnets 49 may be suitably affixed to the ends of the arms 47 for coaction with metal pieces 18 embedded in the table top 22 or, this arrangement may be reversed so that the magnets are embedded in the table top and metal pieces are carried by the arms 47. Blocks 50 are suitably connected to lower intermediate portions of the arms 47, and the numerals 51 indicate yieldable pads that are suitably affixed to the blocks 50. Manually operable knobs 52 are suitably affixed to the arms 47 as at 53.

There is further provided a cutting mechanism which is indicated generally by the numeral 54 and the cutting mechanism 54 comprises a housing 55 that is affixed to the table top 22, and the housing 55 is provided with an L-shaped or bayonet slot 56 therein which includes angularly arranged portions 57 and 58, FIG. 7. A cutter tube 59 is slidably mounted in the housing 55, and a cutter rod 60 is rotatably mounted in the tube 59, FIG. 10. The housing 55 has an elongated groove therein and a pin 62 extends through an opening 67 in the rod 60, and the outer end portion of the rod 60 has an extension 81 thereon. A projection or lug 63 is affixed to the tube 59 for movement through the bayonet slot 56 and a knob 64 is affixed to the lug 63.

As shown in the drawings, a frame piece 77 is adapted to be mounted in a suitable recessed portion 72 of the table top 22, FIG. 2, and the frame piece 77 may include cut away or recessed sections 68 as well as enlarged recessed portions 69. The numeral 70 indicates film strips, microfilm or the like which is adapted to be ultrasonically spliced or joined in accordance with the present invention, and in FIG. 6 the numeral 71 indicates the slight overlap between the pair of film strips 70.

The numeral 73 indicates a wire type pick up finger which may include angularly arranged portions 74, 75 and 76, and the pick up finger 73 is adapted to have an end portion thereof suitably connected to the outer end of the cutter rod 60.

With further reference to the cutting mechanism 54, the tube 59 is provided with an extension 80 that has a cutting edge 78 thereon, FIG. 7. The rod 60 has an extension or projection 81 which is provided with a cutting edge 69 as shown in the drawings.

From the foregoing, it will be seen that there has been provided an ultrasonic splicer, and in use with the parts arranged as shown in the drawings, the film 70 to be spliced is placed in the machine, and as shown in the drawings the film section 70 on the left side of FIG. 3 may be placed in the machine first and then the film 70 on the right hand side is placed in overlapping relation relative to the film 70 on the left side. After placing the left film 70 in the machine the user or operator pivots or moves the hold down mechanism 46 downwardly by gripping the knob 52 and pivoting the arm 57 downwardly about an axis extending through the pivot pin 48 so that the coacting magnetic members 49 and 18 will retain the hold down member 46 in its lowered position. With the hold down member 46 in this lowered position the yieldable or rubber or plastic pad 51 will engage the upper surface of the film 70 so as to hold the film in place and prevent slippage of the film.

Next, after the hold down members are in their lowered position the cutter mechanism is actuated or advanced. The center axis of the cutter is offset from the center axis of the transducer tool 24 because the film is cut at one side of the central rod 60, and the actual cut should be directly above the center of the transducer tool 24. By properly actuating the cutter mechanism 54 the wire pick up finger 73 will have its portion 74 raise both film sections 70 and these raised film sections will be placed or positioned between the extensions 80 and 81 of the tube 59 and rod 60, and this sequence of steps is illustrated in FIGS. 3-6 of the drawings. When the cutter is fully extended, the knob 64 will be at the end 58 of the bayonet slot 56 and can be rotated sideways or laterally. Rotation of the knob 64 causes rotation of the tube 59 whereby the film is cut in the desired manner between the edges 78 and 79. Then the cutter is retracted, and subsequently the yoke 27 of the anvil mechanism 26 is lowered or pivoted downwardly about and extending through the pins 29, and when the yoke 27 moves downwardly a sufficient distance its end portion 30 will engage or contact the microswitch 44 so as to energize the transducer 23 and transducer tool 24 so that the film 70 is sealed against the anvil 34 that is carried by the crosspiece 33 of the yoke 27.

A recess or groove 68 in the frame piece 77 acts as a guideway or track for the film 70. The enlarged portion 69 of the frame piece 77 provides clearance or finger space for the operator of the machine.

With further reference to the cutter 54, it is to be noted that the tube 59 can rotate a distance equal to the size of the bayonet slot 56. Rotation of the tube 59 causes corresponding rotation of the cutting edge 78 past the fixed edge 79 of the rod 60. The groove or cutout portion 66 permits the tube 59 to rotate in the desired manner. Rod 60 can slide but does not rotate, and similarly the outer housing 55 is fixed in position. The pin 62 permits the rod 60 to slide in and out and this sliding movement can take place because the pin 62 engages the groove 61 which construction lets the rod slide but prevents it from rotating. Both the tube 59 and the rod 60 can move outwardly as for example these parts can move outwardly so that their extensions 80 and 81 can move from the solid line position of FIG. 7 to the broken line position of FIG. 7 and vice versa. By moving the knob 64 the intermediate tube 59 is rotated but, as previously stated, the rod 60 does not rotate since the rod 60 only slides in and out.

The parts can be made of any suitable material and in different shapes or sizes.

The cutter rod has the elongated cutting edge 79 on the extension 81. The pick up wire or finger 73 may be secured to the end of the extension 81 in any suitable manner. The cutter tube 59 has the sharp cutting edge 78 on its extension 80.

It will therefore be seen that there has been provided a high-speed splicer which seals films such as polyester base film ultrasonically, and wherein the machine of the present invention can be used economically and efficiently in splicing Mylar, Cronar, Estar and other polyester base films. Only a few seconds of splicing time is required, and sealing speed is very fast. The machine is economical to operate and does away with splicing tape. In addition, the splice has a high tensile strength, guaranteed repeatability and has a new cutting and handling concept and has a built-in light table for 16 mm. film with a compact console.

The ultrasonic splicer of the present invention can be used for polyester film and movie film, and some of the important features or aspects of the present invention are as follows: The actual splice seal is accomplished through a one shot ultrasonic bar seal and there is no traversing of the tool. The ultrasonic transducer and tool 24 are mounted rigidly below the table facing upward so that the film 70 is placed across the tool 24 when the film is put down on the table, and the advantage of this is that it leaves a clear operating arc on the table for the set up and positioning of the film.

In addition, the actual anvil is the pivoted member that is rotated down thrusting the film 70 on to the tool 24. This serves the dual purpose of an anvil 34 against which the seal is made, and the anvil mechanism 26 also at the same time actuates a switch 44 turning on the ultrasonic power and timing the sealing cycle.

In addition, there is provided a unique cutting device or mechanism which is located just behind the ultrasonic tool on a level with the table. This cutting device 54 has a pick up finger 73 which slides forward, picks up the two overlapping pieces of film as shown in the drawings, and wherein the film is subsequently cut with a rotating action at the same time creating an exact overlap of approximately 25 to 50 thousandths of an inch necessary for effecting a proper seal. Also, the film is held in position on the table top during the actuating and sealing cycle by magnetic hold down mechanisms.

The present invention does not require the lowering of a transducer head over the film or a traversing across after a standard commercial splicer is used to cut and position the film.

Magnets such as the magnets 18 may be embedded in the table to coact with the metal pieces 49 on the ends of the arms 47 for holding the arms 47 down, as previously stated. There are two of the hold down devices 46, inasmuch as there are two sections of film to be sealed, so that there is one hold down device of each of the film strips or sections. Various knobs or handles can be used for conveniently manually raising or lowering the hold down devices and anvils. The anvil 34 has the flexible bands 39 and pivotal support 42 associated therewith, and this permits the anvil 34 to move slightly so that it has the desired degree of flexibility. In FIG. 4 there is illustrated the step of lifting the film slightly to provide the necessary overlapping, followed by the cutting action. The present invention is especially suitable for splicing microfilm without perforations but it may also be used for other types of film such as motion picture film. In addition, the present invention is especially suitable for use in locations where new frames are being cut out and replaced with other film frame, so that the machine of this present invention solves this problem of inserting new frame in the film such as microfilm.

An important advantage of the ultrasonic splicer is that it is not necessary to scrape away the emulsion, as is the case when using adhesive tape or the like. The cutter is unique, and it is to be noted that the cutter raises both films up to a different level so that after the film is cut the film drops down and has a slight desired amount of proper overlap to permit the seal to be made. A vacuum pick up device may be used for the scrap material. The table may have a top made of insulating material which prevents ultrasonic energy from traveling in an undesired path. Also, other accessories such as a trimmer may be used with the present invention.

Minor changes in shape, size and rearrangement of details coming within the field of invention claimed may be resorted to in actual practice, if desired.

What is claimed is:

1. A ultrasonic film splicer comprising a table, including a horizontally disposed top member, a transducer and tool mounted below the top member with the tool facing upwardly, support blocks fixed to said top member, an anvil mechanism comprising a U-shaped yoke including a pair of spaced parallel legs pivotally connected to said block and said yoke including an end portion having a handle element affixed thereto, a cross-piece extending between said legs and connected thereto, an anvil element arranged contiguous to the intermediate portion of said cross-piece, and said anvil member including a body member having securing elements affixed to the sides thereof, flexible bands engaging said securing elements and anchored to said cross-piece, a pivotal support element interposed between said body member and cross-piece, stop members carried by said yoke, a microswitch supported by said top member for engagement and actuation by said yoke; a pair of spaced apart support pieces affixed to said top member, film hold down members including arms pivotally connected to said support pieces, interengaging coacting magnetic means on the ends of said arms and on said top member, yieldable pads operatively affixed to said arms, manually engageable knobs connected to said arms; a cutting mechanism comprising a housing affixed to said top member and having an L-shaped bayonet slot therein, a cutter tube movably mounted in said housing, a cutter rod movably mounted in said tube, there being an elongated groove in said housing, a pin extending through said tube and rod and mounted for movement through said groove, a lug affixed to said tube and mounted for movement in said bayonet slot, a knob affixed to said lug, said lug having a projection on an end thereof which has a cutting edge, a pick up finger connected to said projection, said tube having an extension on its outer end provided with a cutting edge, and a frame piece mounted in said top member and having a recessed portion which defines a guideway and trackway for the film to be spliced.

2. In a cutter for an ultrasonic film splicer, a stationary housing having an L-shaped bayonet slot therein, a cutter tube movably mounted in said housing, a cutter rod movably mounted in said tube, there being an elongated groove in said housing, a pin extending through said tube and rod and mounted for movement through said groove, a lug affixed to said tube and mounted for movement in said bayonet slot, a knob affixed to said lug, said lug having a projection on an end thereof which has a cutting edge, a pick up finger connected to said projection, and said tube having an extension on its outer end provided with a cutting edge.

References Cited

UNITED STATES PATENTS

| | | | |
|---|---|---|---|
| 2,686,556 | 8/1954 | Gerber et al. | 156—515 |
| 3,146,141 | 8/1964 | Woodland | 156—73 |
| 3,193,169 | 7/1965 | Arnold | 156—73 |
| 3,413,173 | 11/1968 | Long | 156—380 |
| 3,419,447 | 12/1968 | Hewitt | 156—515 |
| 3,136,678 | 6/1964 | Herzig | 156—157 |
| 3,330,716 | 7/1967 | Zelnick | 156—380 |
| 3,418,185 | 12/1968 | Galamuth et al. | 156—73 |

SAMUEL W. ENGLE, Primary Examiner

R. E. HART, Assistant Examiner

U.S. Cl. X.R.

156—73, 380